United States Patent Office 3,764,469
Patented Oct. 9, 1973

3,764,469
CARBON-SILICON COATING ALLOYS FOR IMPROVED IRRADIATION STABILITY
Jack C. Bokros, San Diego, Calif., assignor to the United States of America as represented by the United States Atomic Energy Commission
No Drawing. Filed Mar. 24, 1972, Ser. No. 237,908
Int. Cl. G21c 3/06
U.S. Cl. 176—67                                                  1 Claim

ABSTRACT OF THE DISCLOSURE

For ceramic nuclear fuel particles, a fission product-retaining, carbon-silicon alloy coating exhibiting low shrinkage after exposure to fast neutron fluences of 1.4 to $4.8 \times 10^{21}$ n./cm.$^2$ (E=0.18 mev.) at irradiation temperatures from 950° to 1250° centigrade. Isotropic pyrolytic carbon containing from 18 to 34 weight percent of silicon is co-deposited from a gaseous mixture of propane, helium and silane at a temperature of 1350° to 1450° centigrade.

BACKGROUND OF THE INVENTION

The invention described herein was made during the course of, or under, Contract No. AT(04-3)-167 with the United States Atomic Energy Commission.

The invention relates to fission product-retentive coatings for nuclear reactor fuel particles. More particularly, it relates to pyrolytic carbon base alloys for coating the ceramic fuel particles of fast nuclear reactors.

The ceramic fuel elements of fast neutron fission reactors operating at high fluences usually contain as an active material minute spherical particles of a fissionable isotope of uranium or thorium, in the form of an oxide or carbide agglomerated into a pellet or other unitary fuel body for emplacement within the fuel elements of the reactor. In order to contain a radioactive gaseous fission product within individual fuel particles, a coating of pyrolytic carbon or silicon carbide is applied about each particle, encapsulating it in a fluid-tight enclosure. Such coatings are applied in fluid bed coaters by processes exemplified by that disclosed in U.S. Pat. No. 3,249,509 granted May 3, 1966 to J. M. Blocher, Jr.

The patent to Blocher discloses the coating of nuclear fuel particles with a so-called "alloy" of pyrolytic carbon containing from 0.7 to 17.5 weight percent of silicon in the form of silicon carbide, co-deposited with the pyrolytic carbon by the pyrolysis of a hydrocarbon gas such as methane, ethane, acetylene or the like mixed with helium and tetrachlorosilane.

It has been found, however, that difficulties arise when such a coating is used on the fuel particles of fast reactors operating at fluences of from 1.4 to $4.8 \times 10^{21}$ n./cm.$^2$ (E=0.18 mev.) at the relatively high operating temperatures of 950° to 1250° centigrade. Such stringent operating conditions induce shrinkage of the pyrolytic carbon-silicon alloy coating about the particle, leading to cracking and failure of the coating to contain the fission products for the life of the particle.

SUMMARY OF THE INVENTION

It has been discovered that, by increasing to 18 to 34 weight percent the silicon content of a pyrolytic carbon-silicon carbide coating, co-deposited at a temperature below 1500° centigrade from a mixture of propane, helium and silane, the shrinkage of the coating entailed by fast neutron irradiation fluences in the range of 1.4 to $4.8 \times 10^{21}$ n./cm.$^2$ (E=0.18 mev.) and irradiation temperatures of 900° to 1250° centigrade, is unexpectedly reduced by ⅓ to ½.

It is therefore an object of the invention to provide an improved irradiation-resistant, fission product retentive coating for ceramic nuclear fuel particles.

It is another object of the invention to provide a pyrolytic carbon-base coating for nuclear fuel particles that is resistant to the shrinkage hitherto attendant upon exposure to the high neutron fluences associated with fast reactors.

These and other objects of the invention will be apparent as the disclosure continues.

DESCRIPTION OF A PREFERRED EMBODIMENT

The coating of the present invention is deposited upon the particles to be coated by means of fluid bed coating apparatus similar to that shown in the aforementioned Pat. No. 3,249,509 to Blocher, Jr. For the purposes of evaluation, specimens were obtained by vapor deposition onto small graphite disks about 6 millimeters in diameter and 1 millimeter thick included in the fluid bed along with a charge of spherical fuel particles. The method of preparation of coating specimens has been discussed in the following papers:

"Mechanical Properties of Neutron-Irradiated Pyrolytic Carbons" by R. J. Price and J. C. Bokros, Journal of Nuclear Materials, vol. 21 (1967), pages 158–174.

"Radiation-Induced Dimensional Changes and Creep in Carbonaceous Materials" by J. C. Bokros, G. L. Guthrie, R. W. Dunlap, and A. S. Schwartz, Journal of Nuclear Materials, vol. 31 (1969), pages 25–47.

The deposition conditions and structural parameters characterizing the deposits are listed in Table I below:

TABLE I.—DEPOSITION CONDITIONS AND PREIRRADIATION STRUCTURAL PARAMETERS FOR SPECIMENS IRRADIATED

| | Deposition conditions | | | Structural parameters | | | | | | |
|---|---|---|---|---|---|---|---|---|---|---|
| | | Propane | Percent He | Preferred orientation parameters | | | | Density (g./cm.³) | | Si conc. wt., |
| Specimen number | Temp. (° C.) | in He (percent) | through silane | BAF | $R_1$* | $R_-$* | $L_c$ (A.) | Bulk | Carbon | (percent) |
| 4174-109 | 1,450 | 30 | | 1.07 | 0.651 | 0.674 | 27 | 1.51 | 1.51 | 0 |
| 4174-95 | 1,450 | 40 | | 1.08 | 0.649 | 0.675 | 27 | 1.62 | 1.62 | 0 |
| 4174-101 | 1,400 | 30 | | 1.08 | 0.649 | 0.675 | 32 | 1.66 | 1.66 | 0 |
| 4174-111 | 1,400 | 35 | | 1.10 | 0.645 | 0.677 | 32 | 1.79 | 1.79 | 0 |
| 4273-75 | 1,350 | 20 | | 1.08 | 0.649 | 0.675 | 32 | 1.95 | 1.95 | 0 |
| 4322-85 | 1,300 | 40 | 33 | 1.14 | 0.637 | 0.682 | 33 | 2.10 | 2.02 | 7.1 |
| 4322-81 | 1,500 | 40 | 100 | 1.08 | 0.649 | 0.675 | 33 | 2.11 | 1.97 | 12.1 |
| 4322-89 | 1,300 | 40 | 100 | 1.05 | 0.656 | 0.672 | 32 | 2.14 | 2.00 | 12.4 |
| 4322-63 | 1,350 | 20 | 100 | 1.27 | 0.612 | 0.694 | 22 | 2.02 | 1.86 | 12.7 |
| 4322-75 | 1,350 | 40 | 100 | 1.03 | 0.660 | 0.670 | 32 | 2.11 | 1.95 | 13.4 |
| 4322-83 | 1,450 | 40 | 100 | 1.04 | 0.658 | 0.671 | 47 | 2.06 | 1.89 | 13.6 |
| 4174-115 | 1,350 | 40 | 100 | 1.04 | 0.658 | 0.671 | 32 | 2.05 | 1.82 | 18.4 |
| 4322-69 | 1,350 | 20 | 100 | 1.13 | 0.639 | 0.681 | 34 | 2.15 | 1.85 | 23.4 |
| 4322-67 | 1,350 | 40 | 100 | 1.08 | 0.649 | 0.675 | 21 | 1.97 | 1.59 | 26.6 |
| 4322-79 | 1,450 | 20 | 100 | 1.05 | 0.656 | 0.672 | 36 | 2.13 | 1.73 | 28.7 |
| 4322-77 | 1,450 | 20 | 100 | 1.14 | 0.637 | 0.682 | 27 | 2.26 | 1.88 | 28.8 |
| 4174-113 | 1,400 | 30 | 100 | 1.05 | 0.656 | 0.672 | 64 | 2.07 | 1.54 | 34.4 |

*$R_1 = \frac{2}{2+BAF}$; $R_- = 1 - \frac{R_1}{2}$.

Irradiation of the specimens was carried out by placing them in a capsule inserted in a nuclear reactor. The irradiation conditions are given in Table II.

TABLE II.—IRRADIATION CONDITIONS

| Cell number | Fast fluence (E=0.18 mev.) ($10^{21}$ n./cm.²) | Irradiation temperature (° C.) |
|---|---|---|
| 2 | 1.4 | 910 |
| 10 | 4.8 | 1,300 |
| 13 | 4.2 | 1,250 |

Two types of specimens were irradiated. One type was an unrestrained pyrolytic carbon disk that was removed from the graphite substrate disk by grinding away the substrate. The other was a composite specimen that consisted of a low temperature isotropic or alloyed coating on a graphite substrate disk. During irradiation the coating on the composite configuration tended to shrink parallel to the deposition plane but was restrained by the more stable graphite substrate disk. The dimensional changes for the unrestrained disks of coating material were compared with those that were restrained by the graphite substrate.

It was found that in the case of irradiation at 910° centigrade and fluences of from 1.4 to $4.8 \times 10^{21}$ n./cm.² (E=0.18 mev.), the addition of from 18 to 34 weight percent of silicon reduced the volumetric shrinkage by ⅓ to ½, depending on both the silicon concentration and the original carbon density.

When similar specimens were irradiated at 1250° to 1300° centigrade at fluences of from 4.2 to $4.8 \times 10^{21}$ n./cm.² (E=0.18 mev.) it was found that if the silicon concentration is less than about 14 weight percent, its addition to low temperature isotropic pyrolytic carbon has little influence on the irradiation-induced volumetric changes. When the silicon contentration was increased to 18 to 34 weight percent, a large stabilizing effect was found and none of the restrained coatings fractured.

What I claim is:

1. A nuclear fission reactor fuel particle comprising a core of ceramic nuclear fuel and a radiation-resistant fission product retentive coating comprising from more than 20, up to 34, weight percent silicon with the balance pyrolytic carbon.

References Cited

UNITED STATES PATENTS

| 3,677,795 | 7/1972 | Bokros et al. | 117—46 CG |
| 3,249,509 | 5/1966 | Blocher | 176—67 |

CARL D. QUARFORTH, Primary Examiner

R. L. TATE, Assistant Examiner

U.S. Cl. X.R.

117—46 CG; 176—91 SP; 252—301.1 R